United States Patent
Minegishi

(10) Patent No.: US 9,025,873 B2
(45) Date of Patent: May 5, 2015

(54) IMAGE PROCESSING APPARATUS AND CONTROL METHOD THEREFOR

(71) Applicant: Canon Kabushiki Kaisha, Tokyo (JP)

(72) Inventor: Yuka Minegishi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 291 days.

(21) Appl. No.: 13/657,228

(22) Filed: Oct. 22, 2012

(65) Prior Publication Data

US 2013/0121578 A1 May 16, 2013

(30) Foreign Application Priority Data

Nov. 10, 2011 (JP) ................................. 2011-246854
Dec. 20, 2011 (JP) ................................. 2011-278750

(51) Int. Cl.
*G06K 9/34* (2006.01)
*G06K 9/00* (2006.01)
*G06K 9/46* (2006.01)

(52) U.S. Cl.
CPC .............. *G06K 9/34* (2013.01); *G06K 9/00697* (2013.01); *G06K 9/4652* (2013.01)

(58) Field of Classification Search
None
See application file for complete search history.

(56) References Cited

U.S. PATENT DOCUMENTS

| 5,870,103 | A | * | 2/1999 | Luo | 345/630 |
| 6,646,687 | B1 | * | 11/2003 | Vlahos | 348/586 |
| 2005/0093886 | A1 | * | 5/2005 | Kubota | 345/619 |
| 2005/0195317 | A1 | * | 9/2005 | Myoga | 348/370 |
| 2006/0227220 | A1 | * | 10/2006 | Kondo et al. | 348/208.1 |
| 2009/0245626 | A1 | * | 10/2009 | Norimatsu et al. | 382/164 |
| 2010/0027888 | A1 | * | 2/2010 | Katano et al. | 382/173 |
| 2010/0290705 | A1 | * | 11/2010 | Nakamura | 382/173 |

FOREIGN PATENT DOCUMENTS

| JP | 2003-087545 | 3/2003 |
| JP | 2009-050035 | 3/2009 |

* cited by examiner

*Primary Examiner* — Stephen R Koziol
*Assistant Examiner* — Jonathan S Lee
(74) *Attorney, Agent, or Firm* — Cowan, Liebowitz & Latman, P.C.

(57) ABSTRACT

An apparatus comprises a unit which stores a size and scene information for each of a plurality of divided areas obtained by dividing an input image, a unit which obtains a plurality of scene-based images by processing the input image based on the scene information of the plurality of divided areas, a unit which determines composite ratios of the plurality of scene-based images by determining, for each of the plurality of divided areas, a transition pattern of a composite ratio from a first composite ratio within the divided area to a second composite ratio within an area other than the divided area based on the size of the divided area, and a unit which composites the plurality of scene-based images in correspondence with the plurality of the divided areas, in accordance with the determined composite ratios.

22 Claims, 11 Drawing Sheets

FIG. 4A
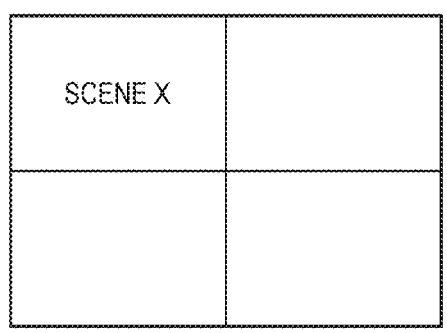
SCENE X
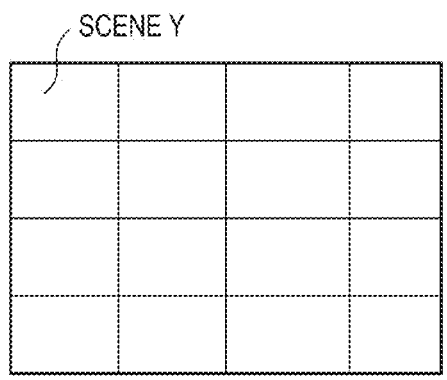
SCENE Y
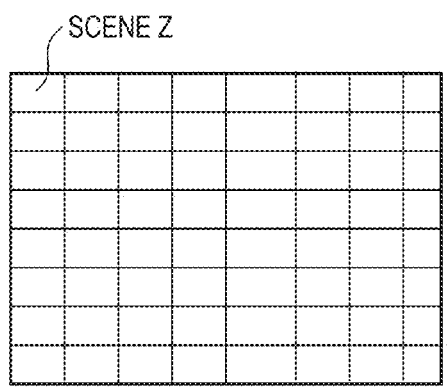
SCENE Z
FIG. 4B
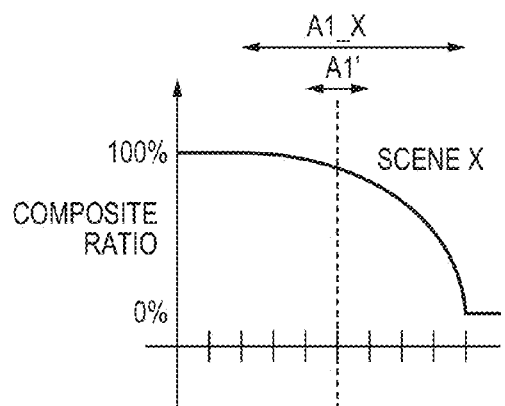
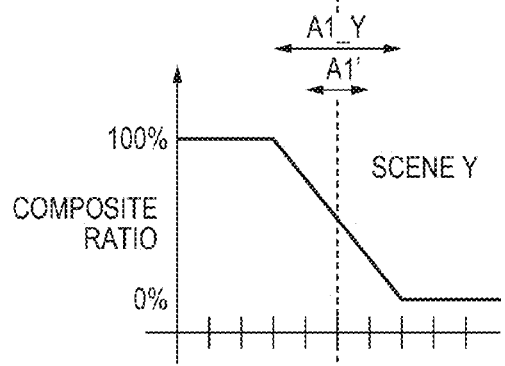
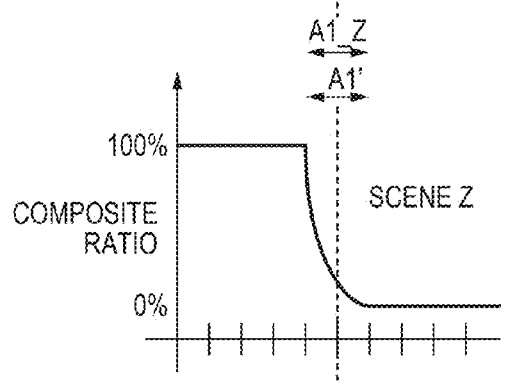

FIG. 5A
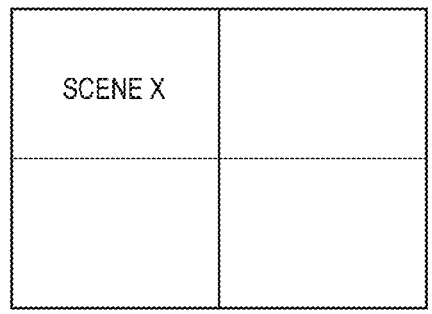
SCENE X
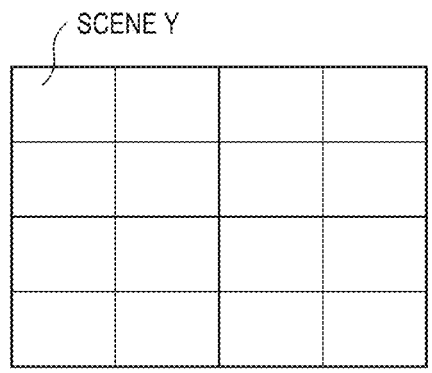
SCENE Y
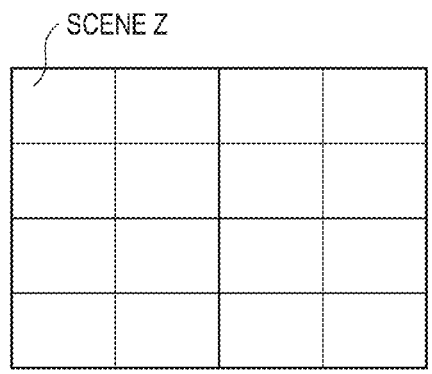
SCENE Z
FIG. 5B
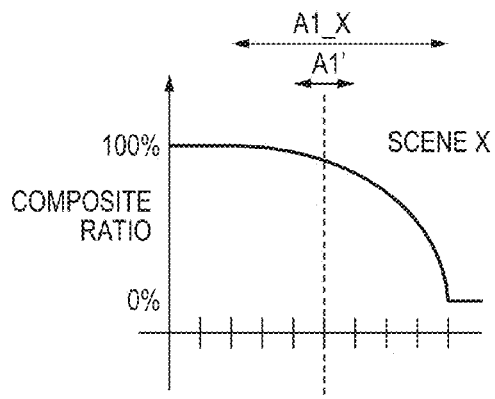
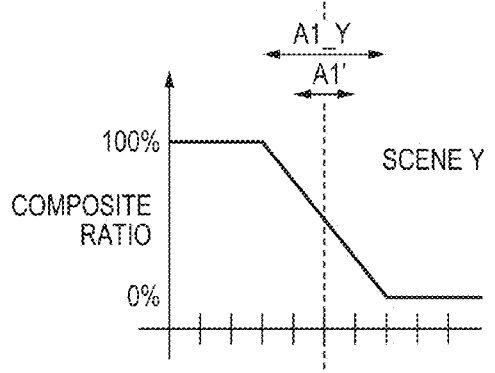
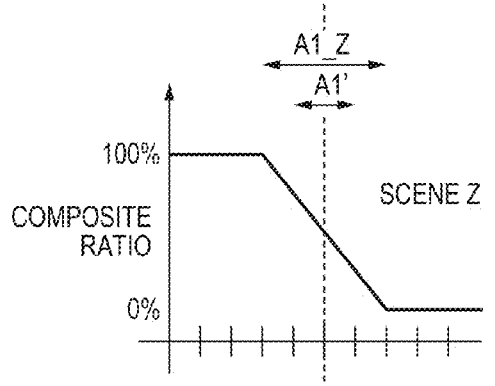

FIG. 6

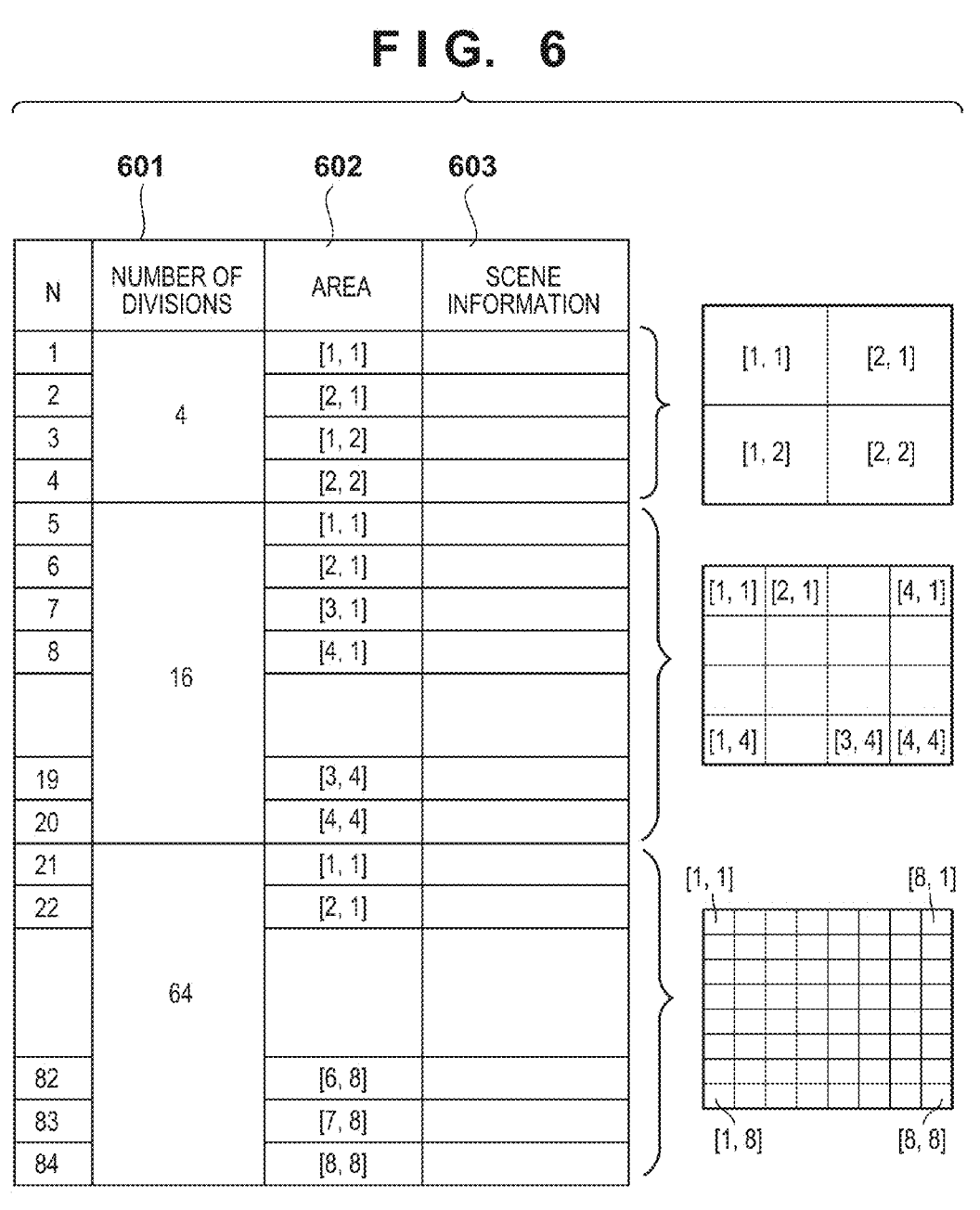

| N | NUMBER OF DIVISIONS | AREA | SCENE INFORMATION |
|---|---|---|---|
| 1 | 4 | [1, 1] | |
| 2 | | [2, 1] | |
| 3 | | [1, 2] | |
| 4 | | [2, 2] | |
| 5 | 16 | [1, 1] | |
| 6 | | [2, 1] | |
| 7 | | [3, 1] | |
| 8 | | [4, 1] | |
| ... | | | |
| 19 | | [3, 4] | |
| 20 | | [4, 4] | |
| 21 | 64 | [1, 1] | |
| 22 | | [2, 1] | |
| ... | | | |
| 82 | | [6, 8] | |
| 83 | | [7, 8] | |
| 84 | | [8, 8] | |

601  602  603

F I G. 7A

| SCENE | IMAGE PROCESSING PARAMETER | PRIMARY COMPOSITE RATIO CHANGE AREA | METHOD OF CHANGE IN COMPOSITE RATIO |
|---|---|---|---|
| A | | | |
| B | | | |
| C | | | |
| | | | |

F I G. 7B

| SCENE | IMAGE PROCESSING PARAMETER | PRIMARY COMPOSITE RATIO CHANGE AREA | METHOD OF CHANGE IN COMPOSITE RATIO | | |
|---|---|---|---|---|---|
| | | | NUMBER OF DIVISIONS=4 | NUMBER OF DIVISIONS=16 | NUMBER OF DIVISIONS=64 |
| A | | | | | |
| B | | | | | |
| C | | | | | |
| | | | | | |

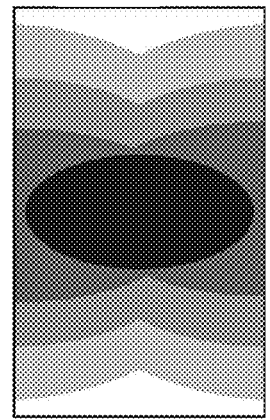
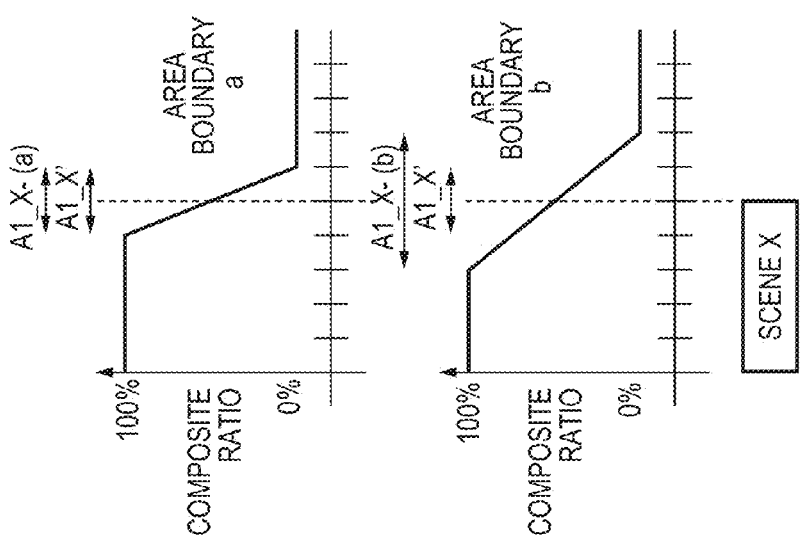
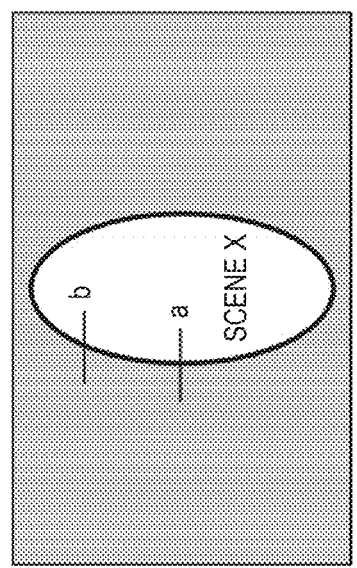
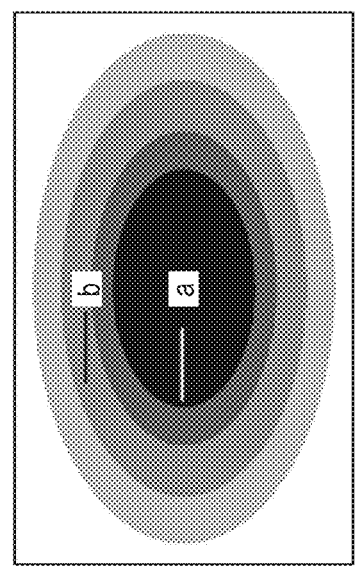

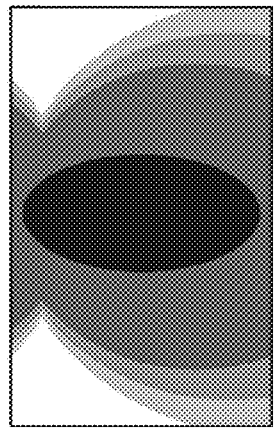
F I G. 10D
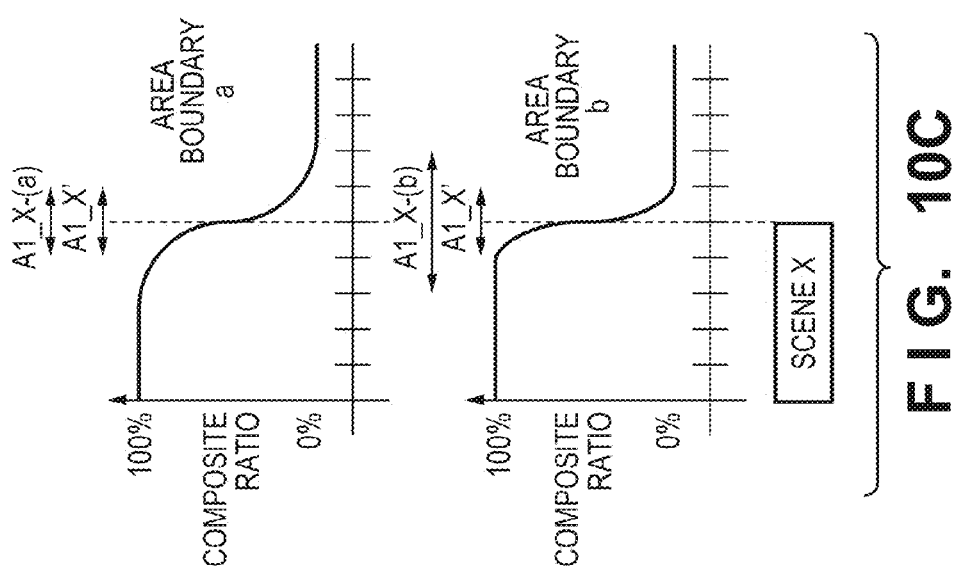
F I G. 10C
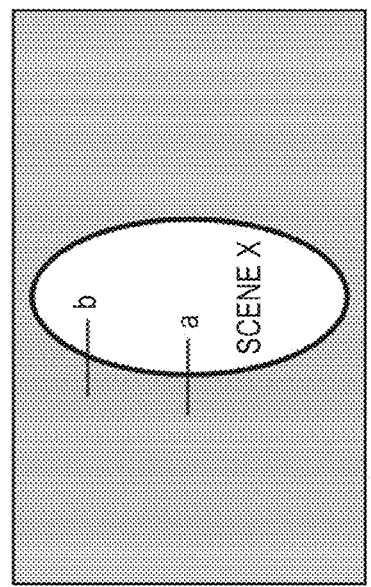
F I G. 10A
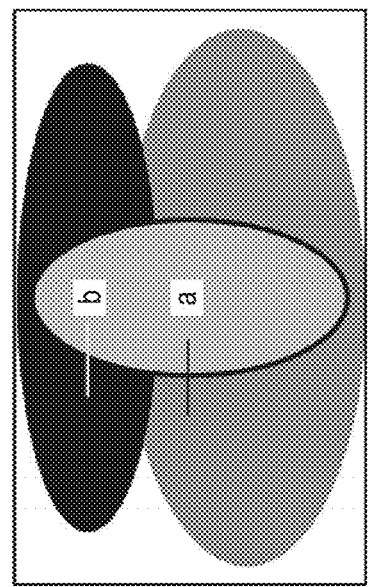
F I G. 10B

IMAGE PROCESSING APPARATUS AND CONTROL METHOD THEREFOR

BACKGROUND OF THE INVENTION

1. Field of the Invention

The present invention relates to image processing technique for dividing one image into a plurality of areas, executing image processing on a per-area basis, and compositing the areas into one image again.

2. Description of the Related Art

In recent years, advancement in image analysis technique has allowed identifying each individual subject in an image. As stated in Japanese Patent Laid-Open No. 2009-050035, this technique makes it possible to execute high-quality image processing on each individual subject area.

This technique also makes it possible to determine a scene for each of the divided areas obtained by dividing an image into a plurality of areas, instead of determining a subject on a per-pixel basis, and to change image processing for each divided area. As such, there is a conventionally known image processing method for dividing one image, executing image processing on a per-area basis, and compositing the areas into one image again.

In addition, there is a conventionally known method for executing image processing not only based on image information obtained from an image targeted for the image processing, but also based on focus measurement information obtained from a focus measurement sensor. In Japanese Patent Laid-Open No. 2003-087545, a pseudo-defocused image is generated by executing image processing on each of areas obtained by dividing an image using a result of image analysis and defocus information.

As such, there is a conventionally known image processing method for dividing one image, executing image processing on a per-area basis, and compositing the areas into one image again.

When image processing is executed on a per-area basis as has been described above, it is possible to obtain a higher quality image and to be able to blur background areas more easily than when the image processing is executed on the entirety of the image. However, when image processing is executed on a per-area basis, there are always area boundaries, and discontinuity thereof may inhibit the effects of high-quality image processing and pseudo-defocus.

Furthermore, it is rare that only one subject is shown in one picture. In many cases, one picture shows a plurality of subjects, namely scenes corresponding to areas. In such cases, it is necessary to composite the scenes so they look natural.

Furthermore, in photographic presentation, a user's intentions, such as a depth of field and composition, should be reflected in a composite image.

SUMMARY OF THE INVENTION

The present invention has been made in consideration of the aforementioned problems, and realizes image processing technique for reducing discontinuity at area boundaries when re-generating one image after executing image processing on a per-area basis.

In order to solve the aforementioned problems, the present invention provides an image processing apparatus comprising: a storage unit configured to store a size and scene information for each of a plurality of divided areas obtained by dividing an input image; an image processing unit configured to obtain a plurality of scene-based images by processing the input image based on the scene information of the plurality of divided areas; a determination unit configured to determine composite ratios of the plurality of scene-based images by determining, for each of the plurality of divided areas, a transition pattern of a composite ratio from a first composite ratio within the divided area to a second composite ratio within an area other than the divided area based on the size of the divided area; and a composition unit configured to composite the plurality of scene-based images, which have been obtained by the image processing unit in correspondence with the plurality of the divided areas, in accordance with the composite ratios determined by the determination unit.

In order to solve the aforementioned problems, the present invention provides a control method of an image processing apparatus, comprising: a step of storing a size and scene information for each of a plurality of divided areas obtained by dividing an input image in a memory; a step of processing the input image based on the scene information of the plurality of divided areas in order to obtain a plurality of scene-based images; a step of determining composite ratios of the plurality of scene-based images by determining, for each of the plurality of divided areas, a transition pattern of a composite ratio from a first composite ratio within the divided area to a second composite ratio within an area other than the divided area based on the size of the divided area; and a step of compositing the plurality of scene-based images, which have been obtained in the step of processing for the plurality of divided areas, in accordance with the composite ratios determined in the determining step.

In order to solve the aforementioned problems, the present invention provides an image processing apparatus comprising: a first scene information obtaining unit configured to obtain scene information for each of a plurality of divided areas obtained by dividing an input image; a second scene information obtaining unit configured to obtain scene information of area boundary portions determined when obtaining the scene information for each divided area; a generation unit configured to generate resultant images by executing image processing on the input image using parameters corresponding to the scene information obtained by the first scene information obtaining unit; a determination unit configured to determine composite ratios at which the resultant images generated by the generation unit are composited based on the scene information for each divided area and the scene information of the area boundary portions; and a composition unit configured to composite the resultant images generated by the generation unit based on the composite ratios.

In order to solve the aforementioned problems, the present invention provides a control method of an image processing apparatus, comprising: a first scene information obtaining step of obtaining scene information for each of a plurality of divided areas obtained by dividing an input image; a second scene information obtaining step of obtaining scene information of area boundary portions determined when obtaining the scene information for each divided area; a generation step of generating resultant images by executing image processing on the input image using parameters corresponding to the scene information obtained in the first scene information obtaining step; a determination step of determining composite ratios at which the resultant images generated in the generation step are composited based on the scene information for each divided area and the scene information of the area boundary portions; and a composition step of compositing the resultant images generated in the generation step based on the composite ratios.

According to the present invention, when re-generating one image after executing image processing on a per-area basis, discontinuity at boundaries can be reduced. It is thus possible to generate a composite image with a natural appearance even when a plurality of scenes are identified from a plurality of areas.

Further features of the present invention will become apparent from the following description of exemplary embodiments with reference to the attached drawings.

BRIEF DESCRIPTION OF THE DRAWINGS

FIGS. 4A and 4B are diagrams for explaining a method for calculating composite ratios according to First Embodiment.

FIGS. 5A and 5B are diagrams for explaining a method for calculating composite ratios according to Second Embodiment.

FIG. 6 shows an example of a state in which divided area information and scene information are stored.

FIGS. 7A and 7B show states in which image processing parameters and information of transition patterns of composite ratios are stored in correspondence with scenes.

FIGS. 9A to 9D are diagrams for explaining a method for calculating composite ratios according to Fourth Embodiment.

FIGS. 10A to 10D are diagrams for explaining a method for calculating composite ratios according to Fifth Embodiment.

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

The following embodiments are described under the assumption that an input image is divided into a plurality of areas, and scene information is obtained by performing scene identification on a per-area basis. First, a description is given of outlines of a configuration and operations of an image processing apparatus according to the embodiments.

Figure 1A:
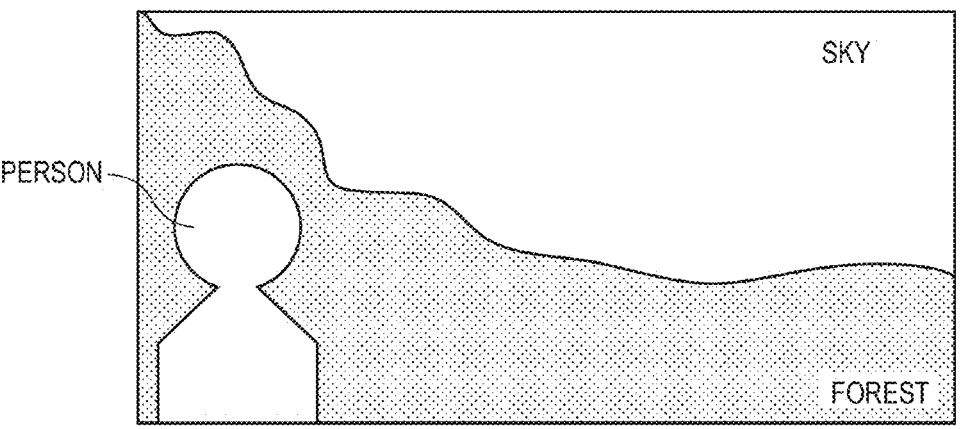
FIGS. 1A to 1C show examples of results of scene identification with various degrees of fineness of area division.
Figure 1B:
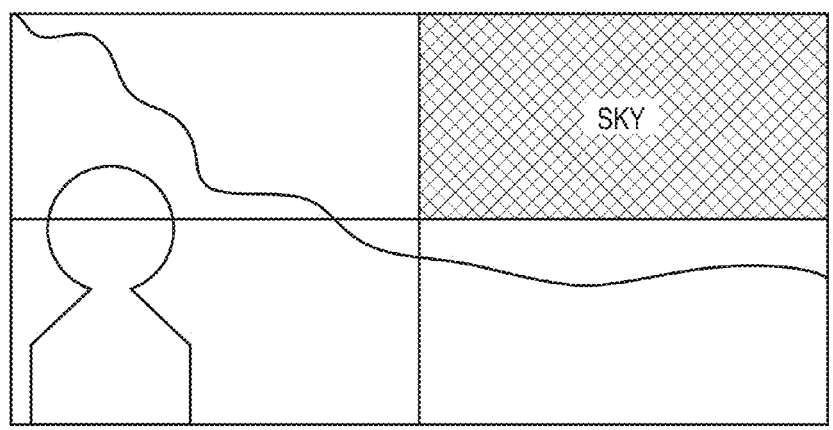
Figure 1C:
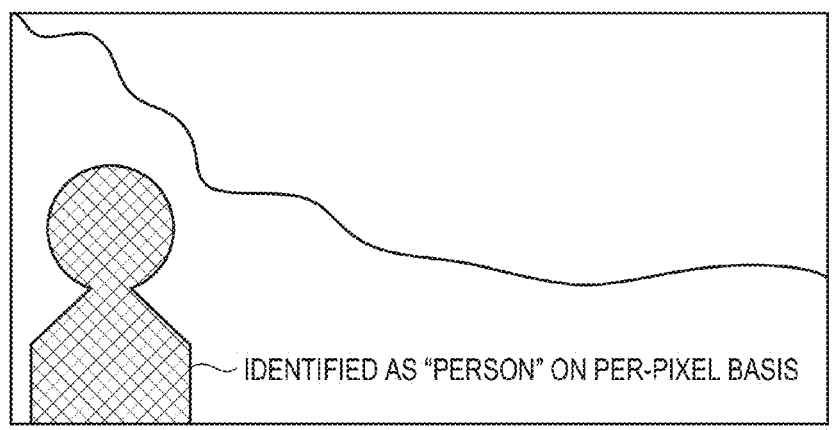

FIG. 1A shows one example of an input image. FIG. 1B shows an example of the case where scene information has been obtained for four divided areas of the input image. FIG. 1C shows an example of the case where scene information has been obtained for areas on a per-pixel basis. The following describes processing for compositing scene-based images that have been subjected to image processing in accordance with scene information of divided areas. Note that the number of divisions is 4 (as shown in FIG. 1B), 16 and 64. In the embodiments, processing for blurring area boundaries is executed during this composition processing. Although the following describes examples in which the input image is divided into 4, 16 and 64 areas, it is possible to use areas for which scene information has been determined on a per-pixel basis (as shown in FIG. 1C) as will be apparent from the following description.

Figure 2:
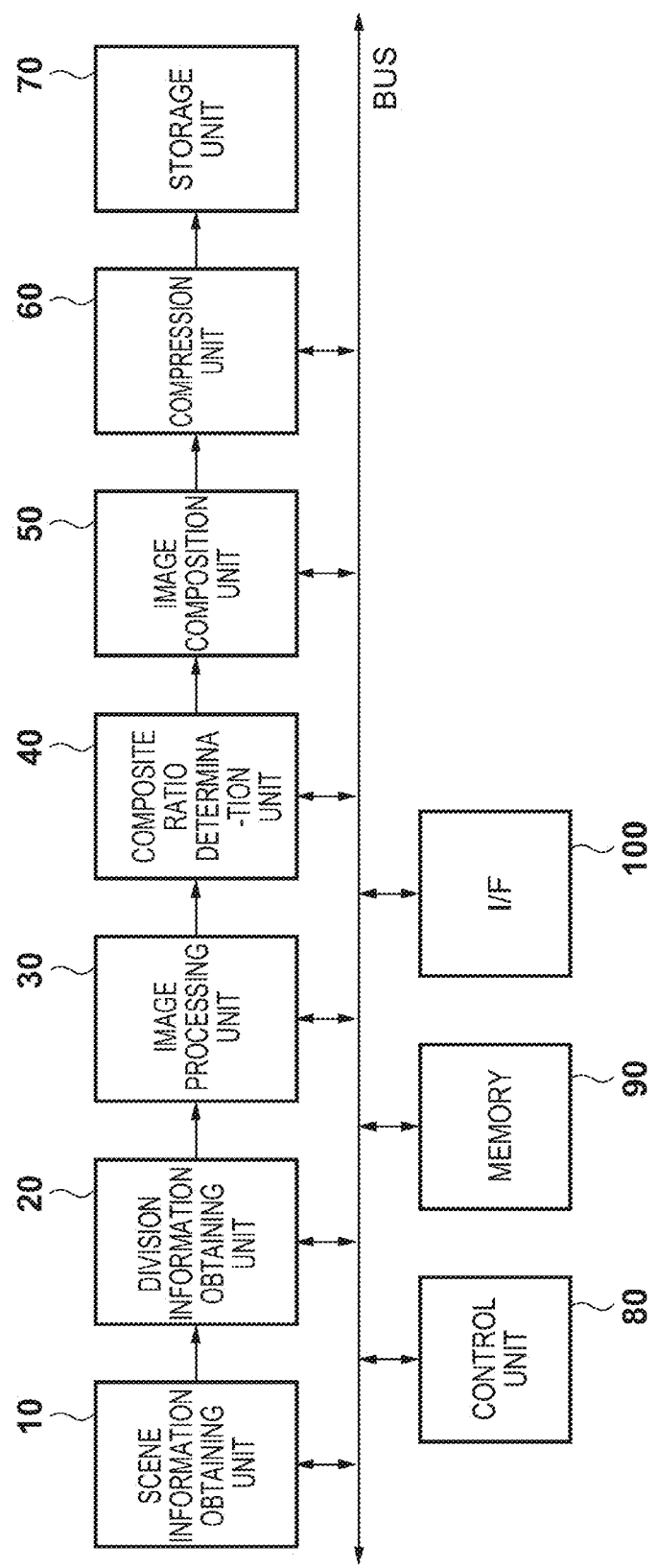
FIG. 2 is a block diagram showing a configuration of an image processing apparatus according to embodiments.

FIG. 2 is a block diagram showing an example of a configuration of the image processing apparatus according to the embodiments. The image processing apparatus according to the embodiments includes a scene information obtaining unit 10, a division information obtaining unit 20, an image processing unit 30, a composite ratio determination unit 40, an image composition unit 50, a compression unit 60, a storage unit 70, a control unit 80, a memory 90, and an interface (I/F) 100.

The scene information according to the embodiments includes, but is not limited to, subject information, light source information, distance information, defocus information, frequency information, hue information, luminance information, and saturation information. It is not required to use all of the above-listed information. A part of the above-listed information may be used as appropriate within the scope of the substance of the scene information. The image processing apparatus according to the embodiments may be realized as a part of an image processing apparatus having an imaging system such as a digital camera, or as an image processing apparatus independent of an imaging system.

In FIG. 2, the memory 90 stores an input image, scene information for each area corresponding to the input image, and area division information. The scene information obtaining unit 10 obtains scene information for each area from the memory 90, and the division information obtaining unit 20 obtains area division information from the memory 90. Note that the scene identification has been performed on the input image in advance, and the memory 90 stores the input image, scene information for each divided area corresponding to the input image, and area division information. FIG. 6 is a diagram for explaining a state in which the memory 90 stores the scene information for each divided area. In the example of FIG. 6, the input image is divided into 4, 16 and 64 areas, and scene information 603 obtained for each divided area is stored. In the embodiments, each divided area can be identified from the number of divisions 601 and an area location 602. Note that N represents serial numbers assigned to the divided areas.

Figure 3A:
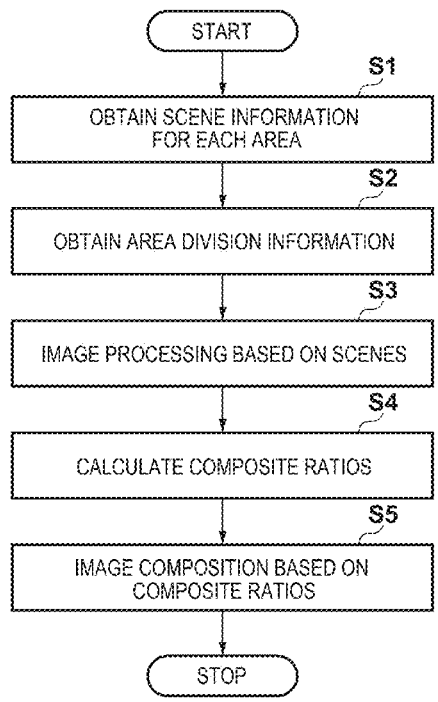
FIGS. 3A and 3B show an example of a method for calculating composite ratios according to embodiments.

FIG. 3A is a flowchart for explaining image composition processing executed by the image processing apparatus according to the embodiments. In step S1, the scene information obtaining unit 10 obtains scene information for each divided area from the memory 90. In step S2, the division information obtaining unit 20 obtains division information of the divided areas (the number of divisions, namely the size of the divided areas) from the memory 90. Note that the memory 90 need not store all of the information shown in FIG. 6. Alternatively, the information shown in FIG. 6 may be stored in another recording medium and loaded into the memory 90 as necessary. Furthermore, the scene information for each area and the area division information may be obtained as a result of the scene information obtaining unit 10 and the division information obtaining unit 20 performing the scene identification on the input image as appropriate. It should be noted that the aforementioned scene information and processing for obtaining the same are known to a person skilled in the art.

Next, in step S3, the image processing unit 30 executes image processing on the input image using parameters corresponding to the scene information obtained from the scene information obtaining unit 10 for each divided area. The images obtained as a result of executing the image processing using the parameters corresponding to the scene information obtained from the scene information obtaining unit 10 for each divided area are referred to as scene-based images. At this time, necessary image processing is also executed in accordance with the input image. For example, when the input image is raw data, developing processing is also executed. That is to say, in the embodiments, an image targeted for processing is not limited to JPEG image data that has been subjected to the developing processing, but may be raw data prior to the developing processing. Through the aforementioned processing, a plurality of scene-based images corresponding to the scene information of the divided areas are generated. For example, when the scene information is obtained for each of four divided areas (i.e. the number of divisions is four), four scene-based images are generated.

Figure 3B:
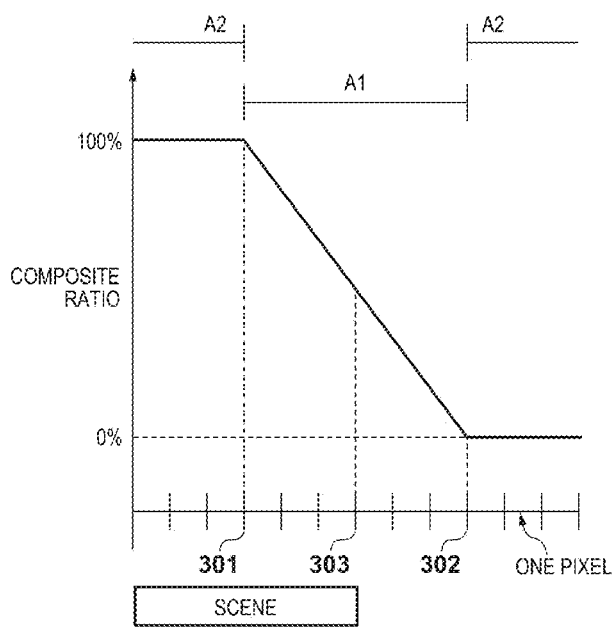

Thereafter, in step S4, the composite ratio determination unit 40 calculates composite ratios of the scene-based images using the scene information obtained from the scene information obtaining unit 10 for the areas, or the area division information obtained from the division information obtaining unit 20 (the number of divisions (low or high fineness), namely the size of the divided areas). FIG. 3B shows one example of a transition pattern from a first composite ratio within a target divided area (100% in FIG. 3B) to a second composite ratio within an external area other than the target divided area (0% in FIG. 3B). That is to say, this transition pattern is determined based on the scene information or the area division information.

First, the composite ratio determination unit 40 determines a composite ratio change area A1 in which the composite ratio is changed in accordance with the scene information obtained from the scene information obtaining unit 10 for each area, or the area division information obtained from the division information obtaining unit 20. Note that the composite ratio change area A1 may be determined as appropriate within the scope of the substance thereof. For example, the composite ratio change area A1 may be determined to be located across an area boundary determined when obtaining the scene information for each divided area (e.g. so that the area boundary serves as the center thereof), located inside an area having the area boundary as its edge, or located outside an area having the area boundary as its edge. For example, when the composite ratio change area A1 is determined so that the area boundary serves as the center thereof, the area boundary is located at 303. When the composite ratio change area A1 is determined to be located inside an area having the area boundary as its edge, the area boundary is located at 302. When the composite ratio change area A1 is determined to be located outside an area having the area boundary as its edge, the area boundary is located at 301.

Next, the composite ratio determination unit 40 determines a method of change in the composite ratio in the composite ratio change area A1 in accordance with the scene information obtained from the scene information obtaining unit 10 for each area, or the area division information obtained from the division information obtaining unit 20. Although the composite ratio is changed along a linear line in FIG. 3B, it may instead be changed along a curve. The method of change in the composite ratio is not limited to a specific method.

Lastly, the composite ratio determination unit 40 sets a composite ratio of an area A2 other than the composite ratio change area A1 to an arbitrary value. In FIG. 3B, the first composite ratio inside the area is set to an arbitrary value of 100%, and the second composite ratio outside the area is set to an arbitrary value of 0%. However, the first composite ratio and the second composite ratio may take any value within the scope of the substance of the present invention. Furthermore, neither the composite ratio inside the area nor the composite ratio outside the area is required to take a constant value. The order of calculation of the composite ratios, namely the order of "determination of the composite ratio change area A1", "determination of the method of change in the composite ratio" and "determination of an arbitrary value for the area A2 other than the composite ratio change area A1" may differ from the aforementioned order within the scope of the substance of calculation of the composite ratios.

Next, in step S5, the image composition unit 50 composites the scene-based images using the composite ratios determined by the composite ratio determination unit 40. More specifically, the image composition unit 50 composites the scene-based images on an image serving as a reference (reference image) in accordance with the determined composite ratios. The reference image is not limited to a specific image. For example, the reference image may be the input image itself, an image obtained by executing image processing on the input image using specific parameters, or an image obtained by compositing a plurality of scenes. The image composition unit 50 composites the scene-based images in order of increasing the area division fineness based on the area division information obtained from the division information obtaining unit 20.

As has been described above, discontinuity at the area boundaries can be reduced by calculating the composite ratios based on the area division information or the scene information and performing the compositing on a per-area basis in accordance with the result of calculation. In particular, by determining a larger composite ratio change area A1 for a divided area with a larger size, discontinuity at the area boundaries can be reduced more efficiently. Furthermore, by calculating the composite ratios using the scene information for each area and the area division information, a composite image with a more natural appearance can be obtained for the case of compositing a plurality of areas.

Note that the order of processing for obtaining the scene information from the scene information obtaining unit 10 and processing for obtaining the area division information from the division information obtaining unit 20 is not fixed within the scope of the substance thereof. Furthermore, the image processing unit 30 may execute the image processing any time after the scene information is obtained from the scene information obtaining unit 10 for each area and before the image composition unit 50 performs the compositing. In the case of areas for which the scene information is determined on a per-pixel basis as in FIG. 1C, the transition pattern of the composite ratio may be determined while an area in which the same scene continues is divided into divided areas and the size of a divided area is determined based on, for example, the number of pixels therein (the surface area thereof).

The image composition unit 50 stores the image obtained as a result of the above-described compositing in the memory 90. The compression unit 60 compresses the composite image stored in the memory 90 using JPEG or other methods. The storage unit 70 stores the image data compressed by the compression unit 60 in a recording medium such as a flash memory. Note that data used by various processing units, such as the image data, the scene information and the area division information, is stored in the memory 90 and the control unit 80 controls these processing units. In some cases, an external operation such as an instruction from an operator is input to the image processing apparatus via the I/F 100.

First Embodiment

The following describes more specific operations of an image processing apparatus according to the First Embodiment of the present invention with reference to FIGS. 4A and 4B.

It is assumed here that a plurality of pieces of scene information for scenes X, Y and Z have been obtained from the scene information obtaining unit 10. In the case of FIG. 4A, the division information obtaining unit 20 obtains area division information indicating that the input image has been divided into 4 areas for the scene X, area division information indicating that the input image has been divided into 16 areas for the scene Y, and area division information indicating that the input image has been divided into 64 areas for the scene Z. To simplify the explanation, it is assumed here that the composite ratio change areas determined based on the scene information obtained from the scene information obtaining unit 10 for areas corresponding to the scenes X, Y and Z have the same size. These composite ratio change areas are referred to as a primary composite ratio change area A1'. This primary composite ratio change area is resized in accordance with the size of the divided areas.

For example, as shown in FIG. 7A, the size of the primary composite ratio change area and the method of change in the composite ratio are stored in the memory 90 for each scene. The image processing unit 30 generates a scene-based image using image processing parameters corresponding to scene information. The composite ratio determination unit 40 obtains the primary composite ratio change area and the method of change in the composite ratio corresponding to scene information, and determines a transition pattern of the composite ratio by resizing the primary composite ratio change area in accordance with the size of the divided areas indicated by the divided area information.

The following describes a method for calculating the composite ratios of the scene-based images corresponding to the scenes X, Y and Z under the above conditions with reference to FIG. 4B. As has been described above, the width of the composite ratio change area is determined to be larger for a scene with lower area division fineness (for a larger divided area) based on the area division information obtained from the division information obtaining unit 20. In the present embodiment, a composite ratio change area A1_X for the case where the number of divisions is four (the scene X) is three times larger than the width of the primary composite ratio change area A1'. A composite ratio change area A1_Y for the case where the number of divisions is 16 (the scene Y) is twice the width of the primary composite ratio change area A1'. A composite ratio change area A1_Z for the case where the number of divisions is 64 (the scene Z) is the same as the width of the primary composite ratio change area A1'. It should be noted here that the resizing of the composite ratio change area A1' is not limited to being changed as in the aforementioned example, and various modifications may be made within the scope of the substance thereof.

Furthermore, the method of change in the composite ratio in the composite ratio change area A1 is changed in accordance with the scene information obtained from the scene information obtaining unit 10 for each area and the area division information obtained from the division information obtaining unit 20. In the aforementioned example, the scene information for the scene X causes the composite ratio to change along a convex upward curve, the scene information for the scene Y causes the composite ratio to change along a straight line, and the scene information for the scene Z causes the composite ratio to change along a convex downward curve. Note that the method of change in the composite ratio is not limited to a specific method within the scope of the substance thereof. Furthermore, the method of change in the composite ratio may vary for the same scene information depending on the number of divisions. For example, even when the scenes X, Y and Z correspond to the same scene information, the size of the change area and the method of change in the composite ratio may both vary as shown in FIG. 4B. In this case, as shown in FIG. 7B, the method of change in the composite ratio is registered with the memory 90 in correspondence with each scene information and each number of divisions (area size).

As has been described above, the image composition unit 50 composites the scene-based images in order of increasing area division fineness. Specifically, in the aforementioned example, the compositing is performed in the order of the scene X, the scene Y and the scene Z. In the case of divided areas having the same size, the compositing may be performed in a predetermined order, or in order of decreasing a distance indicated by distance information included in scene information. Although the input image is divided into $(2^n)^2$ areas (n being an integer greater than or equal to 2) in the aforementioned example, the present invention is not limited in this way. Alternatively, for example, the number of divisions may be 4, 9 and 16. Moreover, the input image is not limited to being divided into rectangular areas. The divided areas may be determined by detecting scene information on a per-pixel basis as shown in FIG. 1C.

Second Embodiment

The following describes more specific operations of an image processing apparatus according to the Second Embodiment with reference to FIGS. 5A and 5B. The First Embodiment has described the case where one piece of scene information is obtained for one divided area. Alternatively, the image processing apparatus may be configured such that one or more pieces of scene information are obtained for one divided area. The Second Embodiment explains this configuration.

In the Second Embodiment, it is assumed that the scene information obtaining unit 10 has obtained scene information for the scenes X, Y and Z. In the case of FIG. 5A, the division information obtaining unit 20 obtains area division information indicating that the input image has been divided into 4 areas for the scene X, and area division information indicating that the input image has been divided into 16 areas for the scenes Y and Z. To simplify the explanation, it is assumed here that the scene information obtaining unit 10 has obtained scene information having the same content except for distance information for the areas corresponding to the scenes X, Y and Z, and that the composite ratio change area determined based on the scene information is a primary composite ratio change area A1'. For example, in the case where a lawn is spread across the divided areas but its distance greatly differs between the upper areas and the lower areas, the scene information generated for the divided areas may have the same content except for the distance information.

The following describes a method for calculating the composite ratios of the scene-based images corresponding to the scenes X, Y and Z under the above conditions with reference to FIG. 5B.

As has been described above, the width of the composite ratio change area is set to be larger for a scene with lower area division fineness based on the area division information obtained from the division information obtaining unit 20. In the aforementioned example, a composite ratio change area A1_X for the scene X is three times larger than the width of the primary composite ratio change area A1', and composite ratio change areas A1_Y and A1_Z for the scenes Y and Z are twice as large as the width of the primary composite ratio change area A1'. Note that a method of change in the width of the composite ratio change area A1' is not limited to a specific method or a specific value within the scope of the substance thereof.

Furthermore, the method of change in the composite ratio in the composite ratio change area A1 is changed in accordance with the scene information obtained from the scene information obtaining unit 10 and the area division information obtained from the division information obtaining unit 20. In the aforementioned example, the composite ratio of the scene X changes along a convex upward curve, and the composite ratios of the scenes Y and Z change along a straight line. Note that the method of change in the composite ratio is not limited to a specific method within the scope of the substance thereof. Furthermore, the method of change in the width of the composite ratio change area A1' and the method of change in the composite ratio may be changed in accordance with the distance information of each scene.

The image composition unit 50 composites the scene-based images in order of increasing the area division fineness. Specifically, in the aforementioned example, the image composition unit 50 composites the scene-based images starting from the scene X. Next, as to the scenes Y and Z with area divisions of the same fineness, the image composition unit 50 obtains distance information for each of these areas from the scene information obtaining unit 10 and performs the compositing in order from a scene corresponding to the farthest area to a scene corresponding to the nearest area. By using the aforementioned composition order, scenes corresponding to the closer areas account for a larger percentage of the final composite image. In this way, an image with a more natural appearance can be obtained.

Third Embodiment

In First and Second Embodiments described above, a plurality of scene-based images are composited in an order. Third Embodiment discusses the case where a plurality of scene-based images are composited simultaneously. When a plurality of scene-based images are composited simultaneously, pixel values of a composite image are determined by calculating composite ratios of pixels using the composite ratios determined for the plurality of scene-based images. In order to realize the same composition processing as in First and Second Embodiments, it is necessary to calculate a composite percentage of a scene-based image on a per-pixel basis in accordance with the composite ratios determined by the composite ratio determination unit 40 and the composition order. As has been described above, the order in which the image composition unit 50 composites the scene-based images is determined based on the area division information obtained from the division information obtaining unit 20 and the distance information obtained from the scene information obtaining unit 10 for each area.

Figure 8:
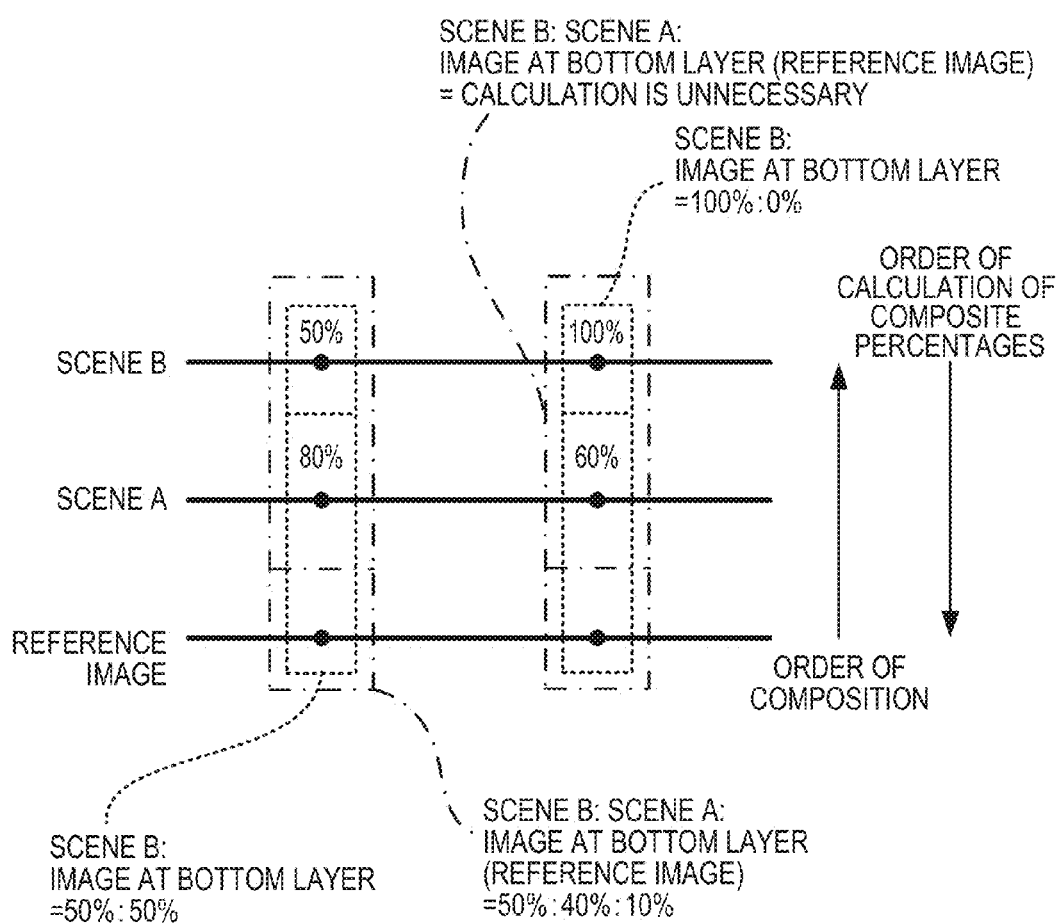
FIG. 8 is a diagram for explaining calculating composite percentages according to Third Embodiment.

For example, assume a case where a certain pixel has a composite ratio of 80% for a first scene-based image obtained from a scene A and a composite ratio of 50% for a second scene-based image obtained from a scene B, as shown in FIG. 8. Provided that the scene B has divided areas of a smaller size and therefore the second scene-based image is composited after the first scene-based image is composited, the composite percentages of a reference image, the first scene-based image and the second scene-based image are 10%:40%:50%.

In the present embodiment, when a plurality of scenes are subjected to the image compositing simultaneously as has been described above, the composite percentages are calculated in the reverse order of the composition order used by the image composition unit 50. That is to say, the composite percentages are calculated in order from a scene composited at the uppermost layer to a scene composited at the lowermost layer. By using this method, when the percentage at which the scenes composited at the upper layers account for the final composite image reaches 100%, it is not necessary to calculate the composite addition ratios for the scenes composited at the lower layers, and therefore the amount of processing time can be reduced. That is to say, the composite percentages are calculated in order from a scene-based image that is composited last out of the plurality of scene-based images, and the calculation of the composite percentages of the pixels is ended when the sum of the composite percentages reaches 100%. For example, in FIG. 8, with regard to a pixel having a composite percentage of 100% for the second scene-based image, it is not necessary to consider the composite percentages for the first scene-based image and the reference image. Accordingly, unnecessary calculation can be avoided.

In the above embodiments, the scene-based images are obtained by processing the entirety of the input image using the scene information of the divided areas. However, the present invention is not limited in this way. For example, the scene-based images may be obtained by executing the image processing only on areas having any composite ratio other than 0 out of the input image. Furthermore, in the above embodiments, the scene-based images are obtained for the scene information of the divided areas. Alternatively, one scene-based image may be commonly used for the same scene information of the divided areas having the same size. Furthermore, the composite ratios determined based on these divided areas and scene information may be collectively set for the commonly used scene-based image. Also, in the above embodiments, the transition pattern of a composite ratio is determined based on the scene information and the size of the divided areas. Alternatively, the composite ratio change area may be changed based only on the size of the divided areas without using the scene information. At this time, the method of change in the composite ratio may also be changed based only on the size of the divided areas.

The above embodiments only use a composite ratio change area with a position of a boundary between divided areas serving as the center thereof. However, a positional relationship between a position of a boundary between divided areas and a composite ratio change area may be changed based on the size of the divided areas and the scene information. More specifically, in FIG. 3B, it is possible to select the position of the boundary from among the positions 301 to 303 based on the size of the divided areas and the scene information. Although the first composite ratio is fixed at 100% and the second composite ratio is fixed at 0% in the above embodiments, they may be changed as well based on the size of the divided areas and the scene information. That is to say, the transition pattern of a composite ratio is defined using at least one of the size of the composite ratio change area, the position of the composite ratio change area with respect to a boundary between divided areas, a method of change in the composite ratio in the composite ratio change area, and the first and second composite ratios.

Fourth Embodiment

A description is now given of a configuration of an image processing apparatus according to the Fourth Embodiment.

The image processing apparatus according to the present embodiment includes first and second scene information obtaining units in place of the scene information obtaining unit 10 and the division information obtaining unit 20 shown in FIG. 2. Other constituent elements are the same as in FIG. 2.

The first scene information obtaining unit obtains scene information for each of a plurality of areas in the input image. The second scene information obtaining unit obtains scene information for an area boundary portion determined when obtaining the scene information for each area.

The image composition processing of the present embodiment is similar to the image composition processing shown in FIGS. 3A and 3B. The scene information obtaining unit 10, the division information obtaining unit 20, and the area division information are replaced with the first scene information obtaining unit 10, the second scene information obtaining unit 20, and "scene information for an area boundary portion", respectively.

The present embodiment makes it possible to reduce discontinuity at area boundaries and to obtain a composite image with a natural appearance reflecting a user's intentions, such as a depth of field and composition by calculating the composite ratios using the scene information for each area and the scene information for an area boundary portion.

With reference to FIGS. 9A to 9D, the following describes a method for calculating image composite ratios using defocus information of area boundary portions in Fourth Embodiment. The following description presents an example in which information of the scene X is obtained from the first scene information obtaining unit 10 as shown in FIG. 9A. Also, it is assumed that defocus information (a defocus map) shown in, for example, FIG. 9B is obtained from the second scene information obtaining unit 20. According to the defocus information shown in FIG. 9B, a darker portion has a defocus amount with a smaller absolute value. That is to say, the absolute value of the defocus amount is small at an area boundary portion (a), and large at an area boundary portion (b). Here, the defocus information may be obtained using any method. For example, the defocus information may be obtained by comparing the input image with an image having a large depth of field that was taken together with the input image in a continuous manner, or may be obtained from an apparatus that detects the defocus information.

The following describes a method for calculating the composite ratios of the area boundary portion (a) and the area boundary portion (b) under the above conditions (FIG. 9C).

First, a composite ratio change area A1_X' corresponding to the scene X obtained from the first scene information obtaining unit 10 is obtained. It is desirable that the composite ratio change area A1_X' be adaptively changed in accordance with scene information. However, the composite ratio change area A1_X' may be fixed with respect to any scene information.

In the present example, a composite ratio change area A1_X-(a) for the area boundary portion (a) that has a defocus amount with a small absolute value is the same as the width of the composite ratio change area A1_X'. Also, in the present example, a composite ratio change area A1_X-(b) for the area boundary portion (b) that has a defocus amount with a large absolute value is twice as large as the width of the composite ratio change area A1_X' (FIG. 9C). A method of change in the width of the composite ratio change area A1_X' corresponding to defocus information is not limited to the aforementioned example. Although it is desirable that the method of change in the width of the composite ratio change area A1_X' be adaptively changed in accordance with defocus information, it may be fixed with respect to any defocus information.

Furthermore, in the present example, the composite ratio is changed along a straight line in the composite ratio change area A1_X in accordance with the scene information obtained from the first scene information obtaining unit 10 and the defocus information obtained from the second scene information obtaining unit 20 (FIG. 9C). A method of change in the composite ratio in the composite ratio change area A1_X is not limited to the aforementioned example. Although it is desirable that the method of change in the composite ratio in the composite ratio change area A1_X be adaptively changed in accordance with scene information for each area and defocus information, it may be fixed with respect to scene information for any area and any defocus information.

Finally, the composite ratio of an area A2_X that is other than the composite ratio change area is set to an arbitrary value of 100 inside the area and to an arbitrary value of 0 outside the area (FIG. 9C). The arbitrary values are not limited to these examples. Although it is desirable that the arbitrary values be adaptively changed in accordance with scene information for each area and defocus information, the arbitrary values may be fixed with respect to scene information for any area and any defocus information.

The image composition unit 50 composites the scene-based images based on the result of calculating the composite ratios in the above manner (FIG. 9D: a darker portion has a higher composite ratio).

Fifth Embodiment

With reference to FIGS. 10A to 10D, the following describes a method for calculating image composite ratios using frequency information of area boundary portions in the Fifth Embodiment. The following description presents an example in which information of the scene X is obtained from the first scene information obtaining unit 10 as shown in FIG. 10A. Also, it is assumed that frequency information (a frequency map) shown in, for example, FIG. 10B is obtained from the second scene information obtaining unit 20. According to the frequency information shown in FIG. 10B, a darker portion has a higher frequency. That is to say, the area boundary portion (a) is a low-frequency portion, and the area boundary portion (b) is a high-frequency portion. Here, the frequency information may be obtained using any method. For example, the frequency information may be obtained by performing a spatial frequency analysis on the input image, or may be obtained from an apparatus that detects the frequency information.

The following describes a method for calculating the composite ratios of the area boundary portion (a) and the area boundary portion (b) under the above conditions (FIG. 10C).

First, a composite ratio change area A1_X' corresponding to the scene X obtained from the first scene information obtaining unit 10 is obtained. It is desirable that the composite ratio change area A1_X' be adaptively changed in accordance with scene information. However, the composite ratio change area A1_X' may be fixed with respect to any scene information.

In the present example, a composite ratio change area A1_X-(a) for the area boundary portion (a), namely the low-frequency portion is twice as large as the width of the composite ratio change area A1_X'. Also, in the present example, a composite ratio change area A1_X-(b) for the area boundary portion (b), namely the high-frequency portion is the same as the width of the composite ratio change area A1_X' (FIG. 10C). A method of change in the width of the composite ratio change area A1_X' corresponding to frequency information is not limited to the aforementioned example. Although it is desirable that the method of change in the width of the composite ratio change area A1_X' be adaptively changed in accordance with frequency information, it may be fixed with respect to any frequency information.

Furthermore, in the present example, the composite ratio is changed along an S-shaped curve in the composite ratio change area A1_X in accordance with the scene information obtained from the first scene information obtaining unit 10 and the frequency information obtained from the second scene information obtaining unit 20 (FIG. 10C). A method of change in the composite ratio in the composite ratio change area A1_X is not limited to the aforementioned example. Although it is desirable that the method of change in the composite ratio in the composite ratio change area A1_X be adaptively changed in accordance with scene information for each area and frequency information, it may be fixed with respect to scene information for any area and any frequency information.

Lastly, the composite ratio of an area A2_X that is other than the composite ratio change area is set to an arbitrary value of 100 inside the area and to an arbitrary value of 0 outside the area (FIG. 10C). The arbitrary values are not limited to these examples. Although it is desirable that the arbitrary values be adaptively changed in accordance with scene information for each area and frequency information, the arbitrary values may be fixed with respect to scene information for any area and any frequency information.

The image composition unit 50 composites the scene-based images based on the result of calculating the composite ratios in the above manner (FIG. 10D: a darker portion has a higher composite ratio).

Sixth Embodiment

Figure 11D:
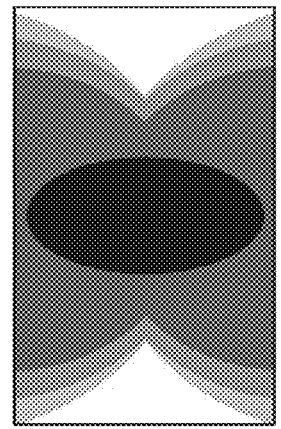
FIGS. 11A to 11D are diagrams for explaining a method for calculating composite ratios according to Sixth Embodiment.
Figure 11C:
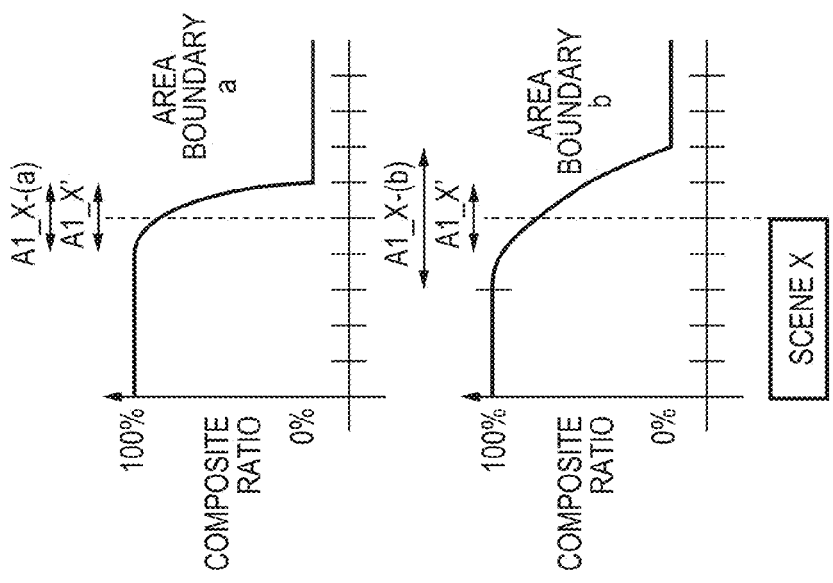
Figure 11A:
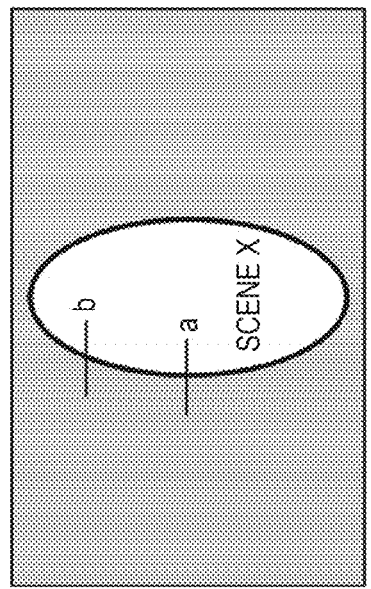
Figure 11B:
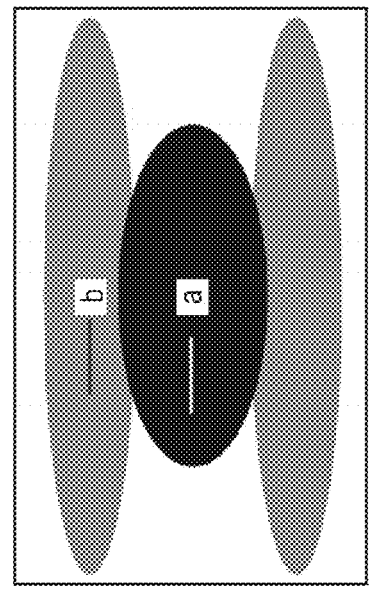

With reference to FIGS. 11A to 11D, the following describes a method for calculating composite ratios of scene-based images using color difference information of area boundary portions in the Sixth Embodiment. The following description presents an example in which information of the scene X is obtained from the first scene information obtaining unit 10 as shown in FIG. 11A. Also, it is assumed that color difference information (a color difference map) shown in, for example, FIG. 11B is obtained from the second scene information obtaining unit 20. According to the color difference information shown in FIG. 11B, a darker portion has a larger color difference amount. That is to say, a color difference amount is large at the area boundary portion (a) and small at the area boundary portion (b). Here, the color difference information may be obtained using any method. For example, the color difference information may be obtained by obtaining the Euclidian distance in a color space of the input image based on a certain color model such as a Lab color model and an RGB color model, or may be obtained from an apparatus that detects the color difference information.

The following describes a method for calculating the composite ratios of the area boundary portion (a) and the area boundary portion (b) under the above conditions (FIG. 11C).

First, a composite ratio change area A1_X' corresponding to the scene X obtained from the first scene information obtaining unit 10 is obtained. Although it is desirable that the composite ratio change area A1_X' be adaptively changed in accordance with scene information, the composite ratio change area A1_X' may be fixed with respect to any scene information.

In the present example, a composite ratio change area A1_X-(a) for the area boundary portion (a) that has a large color difference amount is the same as the width of the composite ratio change area A1_X'. Also, in the present example, a composite ratio change area A1_X-(b) for the area boundary portion (b) that has a small color difference is twice as large as the width of the composite ratio change area A1_X' (FIG. 11C). A method of change in the width of the composite ratio change area A1_X' corresponding to color difference information is not limited to the aforementioned example. Although it is desirable that the method of change in the width of the composite ratio change area A1_X' be adaptively changed in accordance with color difference information, it may be fixed with respect to any color difference information.

Furthermore, in the present example, the composite ratio is changed along a convex upward curve in the composite ratio change area A1_X in accordance with the scene information obtained from the first scene information obtaining unit 10 and the color difference information obtained from the second scene information obtaining unit 20 (FIG. 11C). A method of change in the composite ratio in the composite ratio change area A1_X is not limited to the aforementioned example. Although it is desirable that the method of change in the composite ratio in the composite ratio change area A1_X be adaptively changed in accordance with scene information for each area and color difference information, it may be fixed with respect to scene information for any area and any color difference information.

Lastly, the composite ratio of an area A2_X that is other than the composite ratio change area is set to an arbitrary value of 100 inside the area and to an arbitrary value of 0 outside the area (FIG. 11C). The arbitrary values are not limited to these examples. Although it is desirable that the arbitrary values be adaptively changed in accordance with scene information for each area and color difference information, the arbitrary values may be fixed with respect to scene information for any area and any color difference information.

The image composition unit 50 composites the scene-based images based on the result of calculating the composite ratios in the above manner (FIG. 11D: a darker portion has a higher composite ratio).

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2011-246854, filed Nov. 10, 2011 and 2011-278750, filed Dec. 20, 2011, which are thereby incorporated by references therein in their entirety.

What is claimed is:

1. An image processing apparatus comprising:
a storage for storing a size and scene information for each of a plurality of divided areas obtained by dividing an input image;
a processor for implementing an image processing unit, a determination unit and a composition unit, wherein:
the image processing unit is configured to obtain a plurality of scene-based images by processing the input image based on the scene information of the plurality of divided areas;
the determination unit is configured to determine composite ratios of the plurality of scene-based images by determining, for each of the plurality of divided areas, a transition pattern of a composite ratio from a first composite ratio within the divided area to a second composite ratio within an area other than the divided area based on the size of the divided area; and
the composition unit is configured to composite the plurality of scene-based images, which have been obtained by the image processing unit in correspondence with the plurality of the divided areas, in accordance with the composite ratios determined by the determination unit,
wherein:
the determination unit determines a change area, in which a composite ratio is changed from the first composite ratio to the second composite ratio, based on the scene information of each divided area, and determines a size of the change area based on the size of the divided area.

2. The apparatus according to claim 1, wherein
the determination unit determines at least one of the following as the transition pattern: the first composite ratio, the second composite ratio, a size of the change area, a position of the change area with respect to a boundary between divided areas, and a method of change in the composite ratio in the change area.

3. An image processing apparatus comprising:
a storage for storing a size and scene information for each of a plurality of divided areas obtained by dividing an input image;
a processor for implementing an image processing unit, a determination unit and a composition unit, wherein:
the image processing unit is configured to obtain a plurality of scene-based images by processing the input image based on the scene information of the plurality of divided areas;
the determination unit is configured to determine composite ratios of the plurality of scene-based images by determining, for each of the plurality of divided areas, a transition pattern of a composite ratio from a first composite ratio within the divided area to a second composite ratio within an area other than the divided area based on the size of the divided area; and
the composition unit is configured to composite the plurality of scene-based images, which have been obtained by the image processing unit in correspondence with the plurality of the divided areas, in accordance with the composite ratios determined by the determination unit,
wherein the determination unit determines the transition pattern such that a change area among the divided areas in which a composite ratio is changed from the first composite ratio to the second composite ratio is larger for a divided area having a larger size.

4. The apparatus according to claim 1, wherein
the composition unit composites the plurality of scene-based images in order of decreasing size of the corresponding divided area.

5. The apparatus according to claim 1, wherein
when more than one scene-based images are obtained in correspondence with divided areas having the same size, the composition unit performs compositing in order of descending divided area distance information.

6. The apparatus according to claim 1, further comprising:
an obtaining unit configured to obtain a reference image by processing the input image using a specific parameter,
wherein the composition unit composites the plurality of scene-based images on the reference image in sequence, and
the obtaining unit is implemented by the processor.

7. An image processing apparatus comprising:
a storage configured to store a size and scene information for each of a plurality of divided areas obtained by dividing an input image;
a processor for implementing an image processing unit, a determination unit and a composition unit, wherein:
the image processing unit is configured to obtain a plurality of scene-based images by processing the input image based on the scene information of the plurality of divided areas;
the determination unit is configured to determine composite ratios of the plurality of scene-based images by determining, for each of the plurality of divided areas, a transition pattern of a composite ratio from a first composite ratio within the divided area to a second composite ratio within an area other than the divided area based on the size of the divided area; and
the composition unit is configured to composite the plurality of scene-based images, which have been obtained by the image processing unit in correspondence with the plurality of the divided areas, in accordance with the composite ratios determined by the determination unit,
wherein:
the composition unit includes a calculation unit configured to calculate composite percentages of pixels in a composite image in accordance with the composite ratios determined for the plurality of scene-based images, and composites pixel values by compositing pixels in the plurality of scene-based images in accordance with the calculated composite percentages, and
the calculation unit calculates the composite percentages in order from a scene-based image that is composited last out of the plurality of scene-based images, and ends the calculation of the composite percentages of the pixels when a sum of the composite percentages reaches 100%.

8. A control method of an image processing apparatus, comprising:
a step of storing a size and scene information for each of a plurality of divided areas obtained by dividing an input image in a memory;
a step of processing the input image based on the scene information of the plurality of divided areas in order to obtain a plurality of scene-based images;
a step of determining composite ratios of the plurality of scene-based images by determining, for each of the plurality of divided areas, a transition pattern of a composite ratio from a first composite ratio within the divided area to a second composite ratio within an area other than the divided area based on the size of the divided area; and
a step of compositing the plurality of scene-based images, which have been obtained in the step of processing for the plurality of divided areas, in accordance with the composite ratios determined in the determining step,
wherein the step of determining comprises determining a change area among the divided areas, in which a composite ratio is changed from the first composite ratio to the second composite ratio, based on the scene information of each divided area, and determining a size of the change area based on the size of the divided area.

9. An image processing apparatus comprising:
a processor for implementing a first scene information obtaining unit, a second scene information obtaining unit, a generation unit, a determination unit and a composition unit, wherein:
the first scene information obtaining unit is configured to obtain scene information for each of a plurality of divided areas obtained by dividing an input image;
the second scene information obtaining unit is configured to obtain scene information of area boundary portions determined when obtaining the scene information for each divided area;
the generation unit is configured to generate resultant images by executing image processing on the input image using parameters corresponding to the scene information obtained by the first scene information obtaining unit;
the determination unit is configured to determine composite ratios at which the resultant images generated by the generation unit are composited based on the scene information for each divided area and the scene information of the area boundary portions; and
the composition unit is configured to composite the resultant images generated by the generation unit based on the composite ratios,
wherein
the determination unit sets a width of a change area among the divided areas, in which a composite ratio is changed, to be larger for an area with a smaller number of divisions.

10. The apparatus according to claim 9, wherein
the determination unit changes both change areas of the composite ratios and methods of change in the composite ratios in accordance with the scene information for each divided area and the scene information of the area boundary portions.

11. The apparatus according to claim 9, wherein
information obtained from the second scene information obtaining unit includes at least one of defocus information of the input image, frequency information of the input image, and color difference information of the input image.

12. The apparatus according to claim 9, wherein
information obtained from the first scene information obtaining unit includes information indicating the number of divisions of the divided areas.

13. An image processing apparatus comprising:
a processor for implementing a first scene information obtaining unit, a second scene information obtaining unit, a generation unit, a determination unit and a composition unit, wherein:
the first scene information obtaining unit is configured to obtain scene information for each of a plurality of divided areas obtained by dividing an input image;
the second scene information obtaining unit is configured to obtain scene information of area boundary portions determined when obtaining the scene information for each divided area;
the generation unit is configured to generate resultant images by executing image processing on the input image using parameters corresponding to the scene information obtained by the first scene information obtaining unit;
the determination unit is configured to determine composite ratios at which the resultant images generated by the generation unit are composited based on the scene information for each divided area and the scene information of the area boundary portions; and
the composition unit is configured to composite the resultant images generated by the generation unit based on the composite ratios,
wherein the determination unit changes methods of change in the composite ratios in accordance with the number of divisions.

14. The apparatus according to claim 9, wherein
the composition unit composites the resultant images in order of ascending number of divisions of the divided areas.

15. A control method of an image processing apparatus, comprising:
a first scene information obtaining step of obtaining scene information for each of a plurality of divided areas obtained by dividing an input image;
a second scene information obtaining step of obtaining scene information of area boundary portions determined when obtaining the scene information for each divided area;
a generation step of generating resultant images by executing image processing on the input image using parameters corresponding to the scene information obtained in the first scene information obtaining step;
a determination step of determining composite ratios at which the resultant images generated in the generation step are composited based on the scene information for each divided area and the scene information of the area boundary portions; and
a composition step of compositing the resultant images generated in the generation step based on the composite ratios,
wherein the determination step further comprises setting a width of a change area among the divided areas, in which a composite ratio is changed, to be larger for an area with a smaller number of divisions.

16. The apparatus according to claim 13 wherein
the determination unit changes both change areas of the composite ratios and methods of change in the composite ratios in accordance with the scene information for each divided area and the scene information of the area boundary portions.

17. The apparatus according to claim 13, wherein
information obtained from the second scene information obtaining unit includes at least one of defocus information of the input image, frequency information of the input image, and color difference information of the input image.

18. The apparatus according to claim 13, wherein
information obtained from the first scene information obtaining unit includes information indicating the number of divisions of the divided areas.

19. The apparatus according to claim 13, wherein
the composition unit composites the resultant images in order of ascending number of divisions of the divided areas.

20. A control method of an image processing apparatus comprising:
a step of storing a size and scene information for each of a plurality of divided areas obtained by dividing an input image;

a step of processing the input image based on the scene information of the plurality of divided areas in order to obtain a plurality of scene-based images;

a step of determining composite ratios of the plurality of scene-based images by determining, for each of the plurality of divided areas, a transition pattern of a composite ratio from a first composite ratio within the divided area to a second composite ratio within an area other than the divided area based on the size of the divided area; and a step of compositing the plurality of scene-based images, which have been obtained in the step of processing in correspondence with the plurality of the divided areas, in accordance with the composite ratios determined in the step of determining, wherein the step of determining comprises determining the transition pattern such that a change area among the divided areas in which a composite ratio is changed from the first composite ratio to the second composite ratio is larger for a divided area having a larger size.

21. A control method of an image processing apparatus, comprising:

a step of storing a size and scene information for each of a plurality of divided areas obtained by dividing an input image;

a step of processing the input image based on the scene information of the plurality of divided areas in order to obtain a plurality of scene-based images;

a step of determining composite ratios of the plurality of scene-based images by determining, for each of the plurality of divided areas, a transition pattern of a composite ratio from a first composite ratio within the divided area to a second composite ratio within an area other than the divided area based on the size of the divided area; and a step of compositing the plurality of scene-based images, which have been obtained in the step of processing in correspondence with the plurality of the divided areas, in accordance with the composite ratios determined in the step of determining, wherein:

the step of compositing comprises calculating composite percentages of pixels in a composite image in accordance with the composite ratios determined for the plurality of scene-based images, and compositing pixel values by compositing pixels in the plurality of scene-based images in accordance with the calculated composite percentages, and the step of compositing calculates the composite percentages in order from a scene-based image that is composited last out of the plurality of scene-based images, and ends the calculation of the composite percentages of the pixels when a sum of the composite percentages reaches 100%.

22. A control method of an image processing apparatus, comprising:

a first obtaining step of obtaining scene information for each of a plurality of divided areas obtained by dividing an input image;

a second obtaining step of obtaining scene information of area boundary portions determined when obtaining the scene information for each divided area;

a step of generating resultant images by executing image processing on the input image using parameters corresponding to the scene information obtained in the first obtaining step;

a step of determining composite ratios at which the resultant images generated in the step of generating are composited based on the scene information for each divided area and the scene information of the area boundary portions; and a step of compositing the resultant images generated in the step of generating based on the composite ratios, wherein the step of determining changes methods of change in the composite ratios in accordance with the number of divisions.

* * * * *